United States Patent
Terzich

(10) Patent No.: US 10,361,740 B2
(45) Date of Patent: *Jul. 23, 2019

(54) METHOD AND APPARATUS FOR HOLDING ELECTRONIC DEVICES

(71) Applicant: Smart Product Innovations, LLC, Scottsdale, AZ (US)

(72) Inventor: Zoran Terzich, Northbrook, IL (US)

(73) Assignee: Smart Product Innovations, LLC, Scottsdale, AZ (US)

(*) Notice: Subject to any disclaimer, the term of this patent is extended or adjusted under 35 U.S.C. 154(b) by 0 days.

This patent is subject to a terminal disclaimer.

(21) Appl. No.: 15/836,830

(22) Filed: Dec. 9, 2017

(65) Prior Publication Data

US 2019/0181903 A1 Jun. 13, 2019

(51) Int. Cl.

| H01M 10/44 | (2006.01) |
|---|---|
| H01M 10/46 | (2006.01) |
| H04B 1/3877 | (2015.01) |
| H04B 1/3827 | (2015.01) |
| G06F 1/16 | (2006.01) |
| H02J 7/02 | (2016.01) |

(52) U.S. Cl.
CPC ......... *H04B 1/3877* (2013.01); *G06F 1/1632* (2013.01); *H02J 7/025* (2013.01); *H04B 1/3833* (2013.01); *G06F 1/1626* (2013.01)

(58) Field of Classification Search
CPC .. H02J 7/025; H02J 5/005; H02J 7/355; H02J 7/0042
USPC .................. 320/107, 108, 114, 115; 220/476; 248/682, 671; 206/288, 289, 292, 307, 206/308.1, 308.3
See application file for complete search history.

(56) References Cited

U.S. PATENT DOCUMENTS

| 8,875,879 | B2 * | 11/2014 | Diebel | G06F 1/1626 |
|---|---|---|---|---|
| | | | | 206/320 |
| 10,207,653 | B1 * | 2/2019 | Terzich | B60R 11/0252 |
| 2015/0068434 | A1 * | 3/2015 | Pajic | A47B 23/00 |
| | | | | 108/25 |
| 2018/0287425 | A1 * | 10/2018 | Mortun | H02J 50/10 |

* cited by examiner

*Primary Examiner* — Edward Tso
(74) *Attorney, Agent, or Firm* — Lightbulb IP, LLC

(57) ABSTRACT

A tiered electronic device holder supports electronic devices in a variety of shapes and sizes, in at least a portrait and landscape orientation. The tiered electronic device holder comprises a plurality of brackets positioned along a "V" shaped path. A first pair of brackets of the plurality of brackets receive an electronic device therebetween, while one or more or another pair of brackets below the first pair of brackets supports a bottom edge of the electronic device. The first pair of brackets are selected based on the size and orientation of the electronic device. The brackets extend from a body, one or more rails, or both.

20 Claims, 3 Drawing Sheets

METHOD AND APPARATUS FOR HOLDING ELECTRONIC DEVICES

BACKGROUND OF THE INVENTION

1. Field of the Invention

The invention relates to supports for electronic devices and in particular to a tiered electronic device holder.

2. Related Art

Electronic devices, such as smartphones, tablets, portable gaming machines and media players are typically handheld. In some situations, users desire hands free operation whereby an electronic device can be used without holding the electronic device.

From the discussion that follows, it will become apparent that the present invention addresses the deficiencies associated with the prior art while providing numerous additional advantages and benefits not contemplated or possible with prior art constructions.

SUMMARY OF THE INVENTION

A tiered electronic device holder is disclosed herein. The tiered electronic device holder allows a variety of electronic devices to be supported in an upright position for handsfree operation. An electronic device may be supported in portrait or landscape mode. In addition, a wide variety of electronic devices in various shapes and sizes can be supported by the same tiered electronic device holder.

Various embodiments of the tiered electronic device holder are disclosed herein. For instance, in one exemplary embodiment, an electronic device holder is disclosed, comprising a body having a tapered portion at a back end of the electronic device holder, one or more rails at a front end of the electronic device holder, and one or more pairs of brackets. Each of the one or more pairs of brackets are positioned along an edge of the tapered portion, with each of the brackets extending between the body and the one or more rails.

Each of the brackets in the one or more pairs of brackets may have the same vertical position to hold an electronic device level. Each of the brackets in the one or more brackets may have an arcuate shape. The one or more rails may be transparent. In addition, the body may have a diamond shape. One or more flanges may be included as well. Each of the one or more flanges may extend between the body and the one or more rails. A wireless charging device may be at the body.

In another exemplary embodiment, an electronic device holder is disclosed, with such electronic device holder comprising a body, and a plurality of pairs of brackets. Each of the brackets in the plurality of pairs of brackets have the same vertical position and arranged along a "V" shaped path. In addition, the plurality of pairs of brackets extend outward from the body.

Each of the brackets in the plurality of pairs of brackets may have an arcuate shape. One or more rails may be included as well with the plurality of pairs of brackets being between the one or more rails and the body. The body may have a "V" shape or a diamond shape. The body may be transparent. In addition, the electronic device holder may include a wireless charging device at the body.

Various methods are disclosed herein as well. For instance, in one embodiment, a method for supporting a planar electronic device is disclosed, with such method comprising providing an electronic device holder comprising a body and a plurality of brackets positioned along a "V" shaped path, receiving the planar electronic device between a first pair of the plurality of brackets, and engaging a bottom edge of the planar electronic device with one or more of the plurality of brackets positioned below the pair of the plurality of brackets. The planar electronic device is supported in an upright position proximate the body.

It is noted that the electronic device holder may have one or more rails with the plurality of brackets extending between the one or more rails and the body. Each of the plurality of brackets may have an arcuate shape. In addition, the body may have a "V" shape or a diamond shape. A wireless charging device may be provided at the body that charges the planar electronic device when the planar electronic device is proximate the body.

Other systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE DRAWINGS

The components in the figures are not necessarily to scale, emphasis instead being placed upon illustrating the principles of the invention. In the figures, like reference numerals designate corresponding parts throughout the different views.

DETAILED DESCRIPTION OF THE INVENTION

In the following description, numerous specific details are set forth in order to provide a more thorough description of the present invention. It will be apparent, however, to one skilled in the art, that the present invention may be practiced without these specific details. In other instances, well-known features have not been described in detail so as not to obscure the invention.

In general, the tiered electronic device holder herein provides a support that can hold a variety of electronic devices in various orientations. Some exemplary electronic devices include portable electronic devices such as smartphones, tablets, convertible laptops, media players, and portable gaming machines. The tiered electronic device holder is advantageous in that it permits electronic devices of a wide variety of sizes to be held or otherwise supported for handsfree operation. In addition, the tiered electronic device holder allows one or more electronic devices to be quickly and easily be received and removed.

Figure 1:
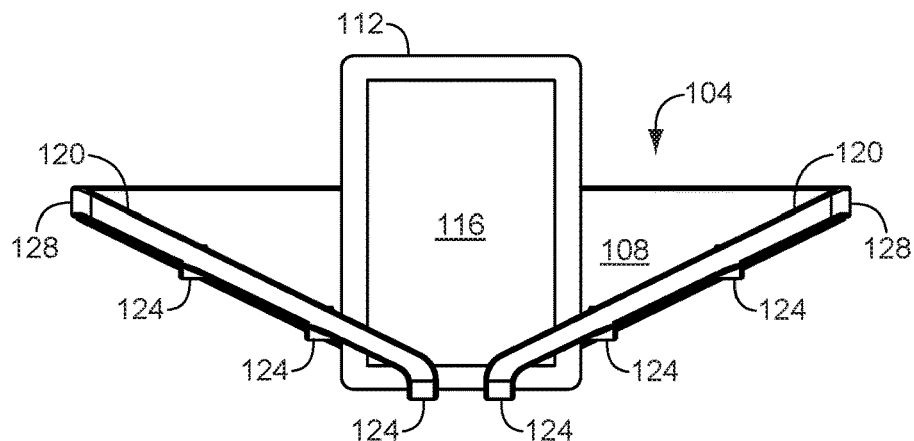
FIG. 1 is a front view of an exemplary tiered electronic device holder in operation.

FIG. 1 illustrates a front view of an exemplary tiered electronic device holder 104 in operation. In FIG. 1, a planar electronic device 112, such as a tablet or smartphone, is supported by the tiered electronic device holder 104.

Figure 2:
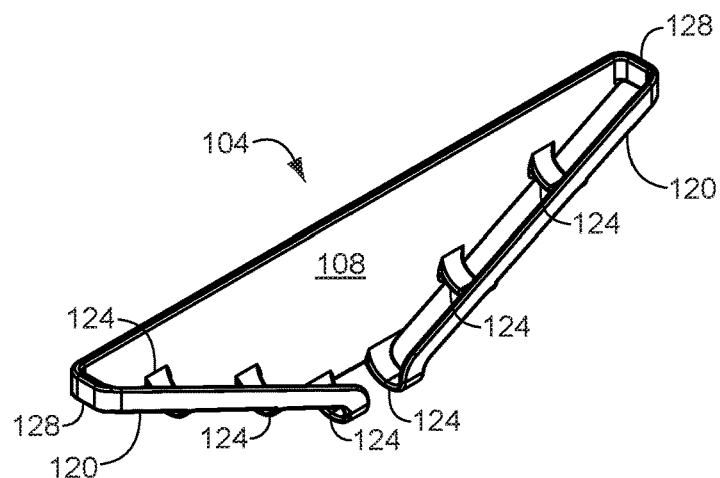
FIG. 2 is a top perspective view of an exemplary tiered electronic device holder.
Figure 3:
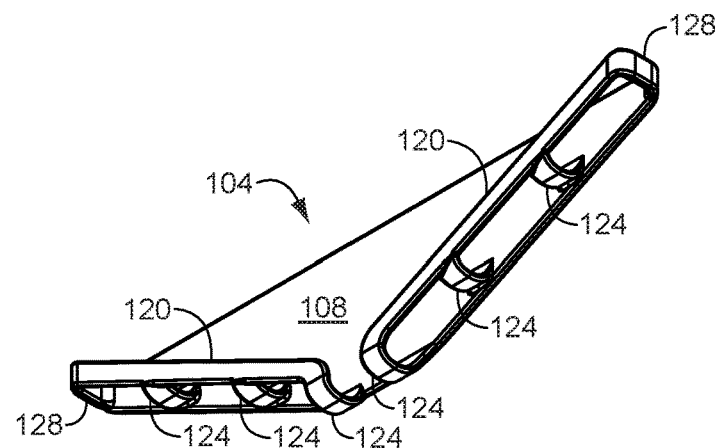
FIG. 3 is a bottom perspective view of an exemplary tiered electronic device holder.

Referring to FIGS. 2 and 3, which respectively illustrate a top perspective view and a bottom perspective view, it can be seen that a tiered electronic device holder 104 may comprise a body 108 at its back end. The body 108 may be a planar structure that may be tapered, such as to form a "V" shape. A plurality of brackets 124 may be positioned diagonally along a surface of the body 108. To illustrate, one or more brackets may be positioned along a tapered edge of the body 108, or along a "V" shaped path such as shown in FIGS. 1-3. Each bracket 124 may extend outward from the body 108 and provide a structure that engages an electronic device 112 when the electronic device is received by a tiered electronic device holder 104.

In one or more embodiments, a bracket 124 may be an arcuate structure that receives an electronic device 112 in a concave portion of the arcuate structure. This provides a structure that cradles a bottom end or edge of an electronic device 112 to hold the same in position. As shown in FIG. 1 for example, a bottom edge of the electronic device 112 engages a concave portion of the bottommost brackets 124. This holds the electronic device 112 upright such that its display screen 116 can be readily viewed by a user.

Brackets 124 may be positioned in a stepped or tiered manner, such as shown in FIGS. 1-3. As will be described further below, this allows electronic devices having a wide variety of sizes and shapes to be supported by the tiered electronic device holder 104. In addition, the tiering of brackets 124 permits electronic devices of various shapes and sizes to be supported in portrait, landscape and other orientations.

Brackets 124 may be provided in pairs in one or more embodiments, with each bracket of a pair having the same or substantially the same vertical position. This allows a pair of brackets 124 to hold an electronic device 112 level.

One or more rails 120 may be provided to support a front end of one or more brackets 124. Typically, a rail 120 will be a thin elongated structure so as to not obscure a display screen 116 of an electronic device. A rail 120 may be planar as well. Alternatively or in addition, it is contemplated that a rail 120 may be transparent in one or more embodiments. For example, a rail 120 may be formed from a transparent material, such as plastic, plexiglass, acrylic or the like.

A rail 120 may be positioned diagonally, such as to correspond to the taper of a body 120. As can be seen from FIGS. 1-3 for example, one or more rails 120 may be parallel to the tapered edge of a body 120. Rails 120 may form a tapered shape, such as a "V" shape, in this manner.

A rail 120 may comprise a flange 128 at one or both of its ends that connect the rail to a body 108. In some embodiments, bracket 124 may be at one or both ends of a rail 120 and connect the rail to a body 108. As shown in FIGS. 1-3 for example, the rails 120 are attached to the body 108 by a bracket 124 at one end of each rail and by a flange 128 at the other end of each rail. Individual rectangular loops, such as can be seen in FIG. 3, may be formed by rails 120 and their connecting structures (i.e., flanges 128, brackets 124 or both). It is contemplated that a flange 128 need not be provided in all embodiments since one or more brackets 124 may be used to connect a rail 120 to a body 108.

Though shown as having a body 108 at its back end and one or more rails 120 at its front end, it will be understood that a tiered electronic device holder 104 may comprise one or more rails 120, rather than a body 108, at its back end. Alternatively, a tiered electronic device holder 104 may comprise a body 108 at its back end and front end. In such an embodiment, at least the body 108 at the front end may be formed from a transparent material to permit viewing and use of an electronic device 112. In other words, a body 108 and rails 120 may be interchangeable structures in some embodiments.

In some embodiments, a rail 120 need not be provided. For example, a tiered electronic device holder 104 may simply have outwardly extending brackets 124 in some embodiments. Such brackets 124 may be arcuate or angled so as to prevent a bottom edge of an electronic device 112 from sliding off a bracket.

Figure 4:
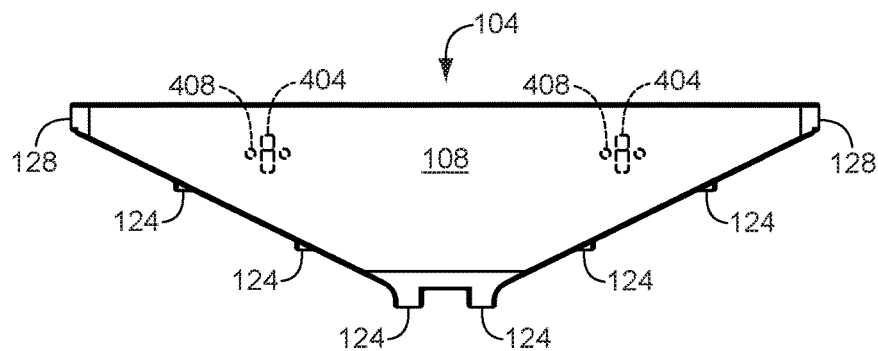
FIG. 4 is a back view of an exemplary tiered electronic device holder.

FIG. 4 illustrates a back view of an exemplary tiered electronic device holder 104. As can be seen, one or more mounts 404 may be provided to secure a tiered electronic device holder 104 at its back end. In one or more embodiments, a mount 404 may be secured to a body 108 of a tiered electronic device holder 104. A mount 404 may be a clip, hook, hanger, magnet, suction cup or the like. In general, a mount 404 will be a structure that secures a tiered electronic device holder 104 to another structure. It is contemplated that one or more mounting orifices 408 of various shapes may be formed to allow one or more fasteners, such as screws, rivets, pins or the like, to secure a tiered electronic device holder to another structure.

Figure 5:
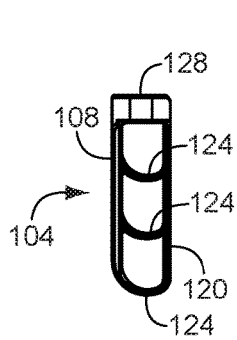
FIG. 5 is a side view of an exemplary tiered electronic device holder.

FIG. 5 illustrates a side view of an exemplary tiered electronic device holder 104. The brackets 124 shown in FIG. 5 illustrate an exemplary arcuate shape for the brackets. As can be seen, each bracket 124 may provide a concave portion for receiving a portion (i.e., an edge) of an electronic device. The electronic device can then be cradled therein to help prevent the electronic device from sliding when received by a tiered electronic device holder 104. In addition, the structure of each rail 120 prevents an electronic device 104 from sliding off a bracket 124 at a front end of a tiered electronic device holder. A body 108 provides a structure that prevents an electronic device from sliding off a bracket at a back end of a tiered electronic device holder 104.

Figure 6:
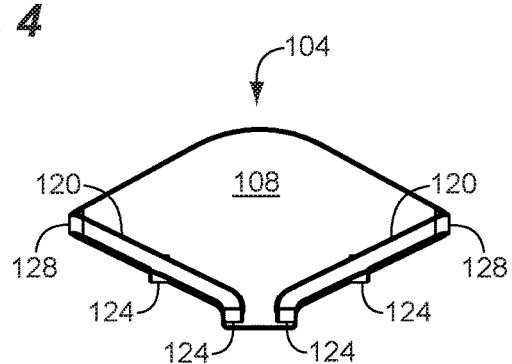
FIG. 6 is a front view of an exemplary tiered electronic device holder.

A tiered electronic device holder 104 may be provided in a variety of shapes and sizes. FIG. 6 illustrates an exemplary embodiment that has a distinct shape and size from the above-described embodiments. Namely, the body 108 in FIG. 6 has a diamond shape. In addition, fewer brackets 124 are provided and the overall shape of the embodiment in FIG. 6 is smaller.

It is noted that the diamond shape of the body 108 may be advantageous for engaging a back end of an electronic device, to hold the electronic device in an upright position. The diamond shape provides an elongated surface that may engage a back end of an electronic device to prop the electronic device up in an upright position, such as shown in FIG. 1.

Figure 7:
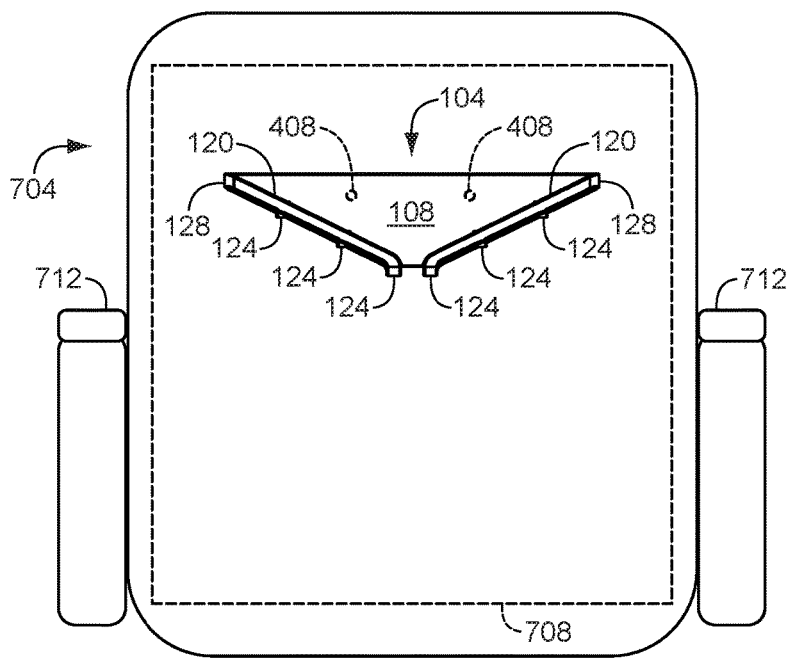
FIG. 7 illustrates an exemplary tiered electronic device holder in an environment of use.

FIG. 7 illustrates an embodiment of a tiered electronic device holder 104 in an exemplary environment of use. In the illustration of FIG. 7, the tiered electronic device holder 104 is secured to a structure 708 that is part of a seat 704 having armrests 712. As can be seen, such seat 704 may be a passenger seat, such as of an aircraft, bus, car, boat or other vehicle. A tiered electronic device holder 104 may also be secured to other seating, such as seats of a stadium, theater, concert hall or other venue. As can be seen, one or more orifices 408 (or mounts) may accept a fastener to secure a tiered electronic device holder 104 to a structure 708.

Though shown secured to a seat 704, it is contemplated that a tiered electronic device holder 104 may be attached to a variety of structures 708. Some exemplary structures 708 include, walls, doors, and other vertical or generally vertical surfaces. A tiered electronic device holder 104 may also be attached to one or more support arms in some embodiments.

Operation of an exemplary tiered electronic device holder 104 will now be described with regard to FIGS. 8 and 9. As can be seen, a tiered electronic device holder 104 may support a variety of electronic devices with a variety of shapes and sizes. To illustrate, the tiered electronic device holder 104 supports an electronic device 112 in the form of a smartphone in FIG. 8, while an electronic device 112 in the form of a tablet is support in FIG. 9. Each electronic device 112 is supported in an upright position to permit viewing of its display screen 116 and use of the electronic device.

An electronic device 112 will typically be supported by a set of brackets 124, such as shown. In general, an electronic device 112 will be between the pair of brackets 124 that are spaced apart enough to receive the electronic device, while being supported by one or more lower brackets. To illustrate, in FIG. 8 the electronic device 112 is between the second lowermost pair of brackets 124 with the lowest positioned brackets supporting a bottom edge of the electronic device. In FIG. 9, the increased width of the electronic device 112 causes it to be received between the second highest pair of brackets 124, while one or more brackets immediately below support a bottom edge of the electronic device.

As can be seen, in each position, an electronic device 112 may be between a pair of brackets 124. This helps prevent the electronic device from sliding laterally off of the one or more brackets that are supporting it. It is noted that, if place upon the highest brackets 124, a pair of flanges 128 may prevent an electronic device 112 from sliding laterally off such brackets.

In use, a user would locate their electronic device 112 over one or more brackets 124 and then lower the electronic device until an edge thereof is supported by the one or more brackets. The electronic device 112 may be positioned laterally such that it is received between a pair of brackets 124 or flanges 128, such as described above. An electronic device 112 will typically be rotated such that its display screen 116 is visible and accessible, such as shown in FIGS. 8 and 9.

Figure 8:
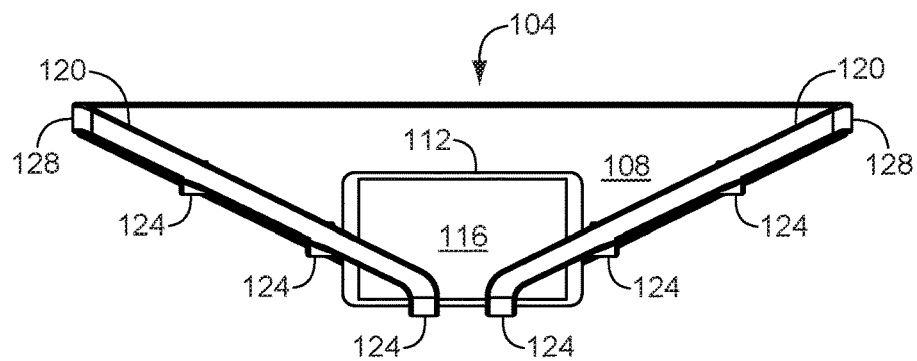
FIG. 8 is a front view of an exemplary tiered electronic device holder in operation.
Figure 9:
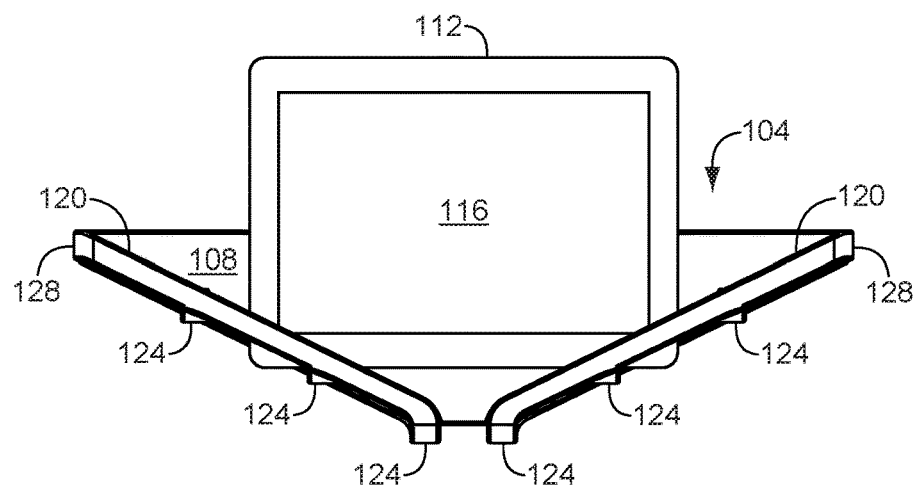
FIG. 9 is a front view of an exemplary tiered electronic device holder in operation.

FIGS. 8 and 9 illustrate electronic devices 112 in a landscape orientation. Referring back to FIG. 1, it can be seen, that electronic devices 112 may also be supported in a portrait orientation by the procedure described above. When desired, a user may remove their electronic device 112 by lifting the electronic device such that it disengages the brackets 124 and is removed from the tiered electronic device holder 104.

Figure 10:
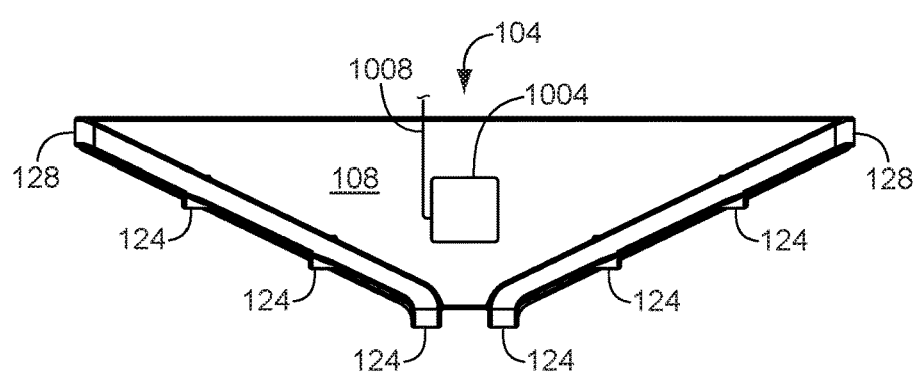
FIG. 10 is a front view of an exemplary tiered electronic device holder.

FIG. 10 illustrates an electronic embodiment of a tiered electronic device holder 104. As can be seen, an induction charger or other wireless charging device 1004 may be provided at a back end of a tiered electronic device holder 104. A wireless charging device 1004 may comprise a sensor that detects the presence of an electronic device 112 in a tiered electronic device holder 104 and automatically begins transmission of power to charge the electronic device. A wireless charging device 1004 may be connected to various power supplies, such as batteries, vehicle power, utility power or other power source, such as via one or more electrical connectors 1008.

While various embodiments of the invention have been described, it will be apparent to those of ordinary skill in the art that many more embodiments and implementations are possible that are within the scope of this invention. In addition, the various features, elements, and embodiments described herein may be claimed or combined in any combination or arrangement.

What is claimed is:

1. An electronic device holder comprising:
a body at a back end of the electronic device holder, the body having a tapered portion;
one or more rails at a front end of the electronic device holder;
one or more pairs of brackets, each of the one or more pairs of brackets positioned along an edge of the tapered portion, wherein each of the brackets extends between the body and the one or more rails.

2. The electronic device holder of claim 1, wherein each of the brackets in the one or more pairs of brackets has the same vertical position.

3. The electronic device holder of claim 1, wherein each of the brackets in the one or more brackets has an arcuate shape.

4. The electronic device holder of claim 1, wherein the one or more rails are transparent.

5. The electronic device holder of claim 1, wherein the body has a diamond shape.

6. The electronic device holder of claim 1 further comprising one or more flanges, each of the one or more flanges extending between the body and the one or more rails.

7. The electronic device holder of claim 1 further comprising a wireless charging device at the body.

8. An electronic device holder comprising:
a body; and
a plurality of pairs of brackets, each of the brackets in the plurality of pairs of brackets having the same vertical position and arranged along a "V" shaped path;
wherein the plurality of pairs of brackets extend outward from the body.

9. The electronic device holder of claim 8, wherein each of the brackets in the plurality of pairs of brackets has an arcuate shape.

10. The electronic device holder of claim 8 further comprising one or more rails, wherein the plurality of pairs of brackets are between the one or more rails and the body.

11. The electronic device holder of claim 8, wherein the body has a "V" shape.

12. The electronic device holder of claim 8, wherein the body has a diamond shape.

13. The electronic device holder of claim 8 wherein the body is transparent.

14. The electronic device holder of claim 8 further comprising a wireless charging device at the body.

15. A method for supporting a planar electronic device comprising:
providing an electronic device holder comprising a body and a plurality of brackets positioned along a "V" shaped path;
receiving the planar electronic device between a first pair of the plurality of brackets;
engaging a bottom edge of the planar electronic device with one or more of the plurality of brackets positioned below the pair of the plurality of brackets;

wherein the planar electronic device is supported in an upright position proximate the body.

16. The method of claim 15, wherein the electronic device holder further comprises one or more rails with the plurality of brackets extending between the one or more rails and the body.

17. The method of claim 15, wherein each of the plurality of brackets has an arcuate shape.

18. The method of claim 15, wherein the body has a "V" shape.

19. The method of claim 15, wherein the body has a diamond shape.

20. The method of claim 15 further comprising providing a wireless charging device at the body that charges the planar electronic device when the planar electronic device is proximate the body.

* * * * *